Patented Apr. 1, 1941

2,236,867

UNITED STATES PATENT OFFICE 2,236,867

BREAD IMPROVER

Herbert H. Bunzell, New York, N. Y.

No Drawing. Application April 17, 1937,
Serial No. 137,477

8 Claims. (Cl. 99—91)

This invention relates to the preparation of bread doughs and to leavened bread obtained therefrom.

In a Patent No. 2,033,180 granted March 10, 1936, there is disclosed a process of preparing bread doughs in which there is included a mixture of urea and an ammonium salt in the dough to improve it. The present invention is an improvement thereover.

The improvement lies in the discovery that a certain kind of ammonium salt, namely, the ammonium salt of propionic acid, is not only effective in combination with urea to give the improved results set out in the above mentioned patent but it has the further highly desirable property of preventing rope infection. Rope infection and a method of determining it is explained in a Patent No. 2,019,950 granted November 15, 1935.

The ammonium propionate is preferably made in the form of a solution or liquid. As an illustration of its preparation about 2 ounces of concentrated propionic acid (between 90 and 100 per cent strength) is diluted with an equal amount of water; with acid of weaker strength the proportions are modified accordingly. To this is added concentrated ammonia water, drop by drop, until the mixture has a pH of about 5 as indicated by methyl red.

In preparing the bread improver about one-half to one ounce of pure urea is added to the above solution, depending on the speed desired in the bread improver. The liquid mixture is then made up to a pint by adding water.

A pint of the improver made as above is usually sufficient for 100 pounds of flour, and it is added to the water used in making a straight dough. It is found as a result that fermentation is speeded up, the volume of bread obtained is increased and the development of rope and mold in the baked bread is retarded. Due to the more rapid fermentation, however, the doughs require watching so that they do not become old.

The proportions given are for purposes of illustration and vary in accordance with the particular process followed in making the dough, whether the straight dough or the sponge dough process. The way in which the improver is incorporated will likewise depend upon the character of the dough and the stage reached in the dough formation.

In place of ammonium propionate other alkaline propionates such as the sodium and potassium propionates can be used provided sufficient acid, such as citric acid, is included to give the acid reaction. The ammonium salt is preferred, however, for its stimulating action on yeast and because it is relatively inexpensive.

The retardation of mold development by means of the improver of the present invention has been strikingly demonstrated by making two sets of bakes under identical conditions using one as a control and treating the dough for the other with the solution as above described. Both sets were exposed to conditions of high humidity at 40° C.; at the end of 4 days the control loaves showed definite moldiness and at the end of 6 days showed extensive moldiness while treated loaves showed none.

What is claimed is:

1. Process of preparing leavened bread which comprises incorporating in a dough made from about 100 pounds of flour approximately one pint of a solution in water of about 2 ounces of propionic acid neutralized with ammonia to a pH of about 5 and from ½ to 1 ounce of urea.

2. Process of preparing leavened bread which comprises incorporating in a dough a mixture showing an acid reaction and including a urea and an ammonium propionate.

3. Leavened dough for bread including a mixture of a urea and ammonium propionate in the proportion of about ½ to 1 ounce of the urea to 2 ounces of propionic acid neutralized with ammonia to a pH of about 5.

4. Leavened dough for bread including a mixture of urea and an ammonium propionate with an acid reaction corresponding to a pH of about 5.

5. Leavened dough for bread including a mixture showing an acid reaction of a urea and ammonium propionate.

6. A bread improver comprising a composition of a urea and ammonium propionate in the proportion of about ½ to 1 ounce of the urea to 2 ounces of propionic acid neutralized with ammonia to a pH of about 5.

7. A bread improver comprising a composition of urea and an ammonium propionate with an acid reaction corresponding to a pH of about 5.

8. A bread improver comprising a composition showing an acid reaction of a urea and ammonium propionate.

HERBERT H. BUNZELL.